(12) United States Patent
Merchant et al.

(10) Patent No.: US 11,095,927 B2
(45) Date of Patent: Aug. 17, 2021

(54) DYNAMIC WATERMARKING OF MEDIA BASED ON TRANSPORT-STREAM METADATA, TO FACILITATE ACTION BY DOWNSTREAM ENTITY

(71) Applicant: The Nielsen Company (US), LLC, New York, NY (US)

(72) Inventors: Shashank C. Merchant, Sunnyvale, CA (US); Benjamin J. Ropke, Rochelle, NY (US); John S. Stavropoulos, Edison, NJ (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 15/929,218

(22) Filed: Feb. 6, 2020

(65) Prior Publication Data

US 2020/0275141 A1   Aug. 27, 2020

Related U.S. Application Data

(60) Provisional application No. 62/882,202, filed on Aug. 2, 2019, provisional application No. 62/809,360, filed on Feb. 22, 2019.

(51) Int. Cl.
*H04N 21/2389* (2011.01)
*H04N 21/236* (2011.01)
(Continued)

(52) U.S. Cl.
CPC . *H04N 21/23892* (2013.01); *H04N 21/23418* (2013.01); *H04N 21/23424* (2013.01);
(Continued)

(58) Field of Classification Search
CPC ....... H04N 21/23892; H04N 21/23424; H04N 21/23614; H04N 21/8547; H04N 21/4305;
(Continued)

(56) References Cited

U.S. PATENT DOCUMENTS 8,041,058 B2 * 10/2011 Kentish ................. G10L 19/018
381/119
8,525,839 B2 * 9/2013 Chaudhri ............ G06F 3/04845
345/473
(Continued)

OTHER PUBLICATIONS

International Search Report and Written Opinion from International Application No. PCT/US2020/017665, dated May 28, 2020.
(Continued)

*Primary Examiner* — James R Sheleheda
(74) *Attorney, Agent, or Firm* — McDonnell Boehnen Hulbert & Berghoff LLP

(57) ABSTRACT

A method and system for dynamically watermarking media content based on transport-stream metadata, to facilitate action by a downstream entity. An intermediary in a media-distribution path could receive a transport stream carrying media content and carrying metadata that is not watermarked in the media content. The intermediary could then obtain from the transport stream the metadata that is not watermarked in the media content and could modify the media content at least by encoding into the media content a watermark that represents the obtained metadata. And the intermediary could then output at least the modified media content for transmission to a downstream entity. The downstream entity could thus obtain from the watermark in the media content the metadata and could use the metadata to facilitate carrying out one or more useful actions.

23 Claims, 5 Drawing Sheets

(51) Int. Cl.
  *H04N 21/8547* (2011.01)
  *H04N 21/43* (2011.01)
  *H04N 21/234* (2011.01)
  *H04N 21/8545* (2011.01)

(52) U.S. Cl.
  CPC ... *H04N 21/23614* (2013.01); *H04N 21/4305* (2013.01); *H04N 21/8545* (2013.01); *H04N 21/8547* (2013.01)

(58) Field of Classification Search
  CPC ............. H04N 21/858; H04N 21/8358; H04N 21/812; H04N 21/8106; H04N 21/4725; H04N 21/262; H04N 21/23418; H04N 21/233
  See application file for complete search history.

(56) References Cited

U.S. PATENT DOCUMENTS

| | | | |
|---|---|---|---|
| 9,037,453 B2* | 5/2015 | Grill | H04N 1/32154 |
| | | | 704/201 |
| 9,055,309 B2* | 6/2015 | Neumeier | H04N 21/23614 |
| 9,571,899 B2 | 2/2017 | Hunacek et al. | |
| 10,231,033 B1* | 3/2019 | Bumgarner | H04N 21/242 |
| 10,805,626 B2* | 10/2020 | Deshpande | H04N 21/8358 |
| 2001/0044899 A1* | 11/2001 | Levy | G07F 7/1008 |
| | | | 713/176 |
| 2002/0021824 A1* | 2/2002 | Reed | G10L 19/018 |
| | | | 382/100 |
| 2002/0059644 A1* | 5/2002 | Andrade | H04N 21/8586 |
| | | | 725/136 |
| 2002/0104090 A1* | 8/2002 | Stettner | H04N 21/4223 |
| | | | 725/60 |
| 2003/0192060 A1* | 10/2003 | Levy | H04N 21/47217 |
| | | | 725/133 |
| 2005/0289151 A1* | 12/2005 | Burke | H04N 21/8543 |
| 2006/0168448 A1* | 7/2006 | Van Der Veen | H04N 1/32149 |
| | | | 713/176 |
| 2006/0222203 A1 | 10/2006 | Mercier | |
| 2007/0186269 A1* | 8/2007 | Malik | H04N 21/4316 |
| | | | 725/135 |
| 2010/0100742 A1 | 4/2010 | Courington et al. | |
| 2010/0253847 A1* | 10/2010 | Krause | H04N 21/23611 |
| | | | 348/584 |
| 2011/0185179 A1* | 7/2011 | Swaminathan | G06F 21/10 |
| | | | 713/176 |
| 2011/0246202 A1* | 10/2011 | McMillan | G10L 19/018 |
| | | | 704/270 |
| 2013/0031582 A1* | 1/2013 | Tinsman | H04N 21/4316 |
| | | | 725/36 |
| 2014/0074566 A1* | 3/2014 | McCoy | G07B 15/063 |
| | | | 705/13 |
| 2014/0074570 A1* | 3/2014 | Hope | G06Q 30/02 |
| | | | 705/14.4 |
| 2014/0075466 A1 | 3/2014 | Zhao | |
| 2014/0150022 A1* | 5/2014 | Oh | H04N 21/478 |
| | | | 725/37 |
| 2014/0245339 A1* | 8/2014 | Zhang | H04N 21/4398 |
| | | | 725/18 |
| 2014/0250479 A1* | 9/2014 | Lee | H04N 21/8358 |
| | | | 725/110 |
| 2015/0063567 A1 | 3/2015 | Robert et al. | |
| 2015/0341410 A1* | 11/2015 | Schrempp | H04L 65/605 |
| | | | 709/231 |
| 2015/0373380 A1* | 12/2015 | Tsukagoshi | H04L 5/22 |
| | | | 725/109 |
| 2016/0055607 A1* | 2/2016 | Petrovic | G06T 1/0085 |
| | | | 382/100 |
| 2016/0182973 A1* | 6/2016 | Winograd | H04N 21/4722 |
| | | | 725/25 |
| 2017/0070790 A1* | 3/2017 | Misra | H04N 21/439 |
| 2017/0164071 A1* | 6/2017 | An | H04N 21/2365 |
| 2018/0376156 A1* | 12/2018 | Deshpande | H04N 21/2353 |
| 2019/0141406 A1* | 5/2019 | Casagrande | H04N 21/4348 |
| 2019/0306577 A1* | 10/2019 | Jeong | G10L 19/018 |
| 2020/0304821 A1* | 9/2020 | Davis | H04N 21/6582 |

OTHER PUBLICATIONS

Ciro A. Noronha, "SCTE-104/35 and Beyong: A Look at Ad Insertion in an OTT World," TV Technology, printed from the World Wide Web, Mar. 10, 2017.

* cited by examiner

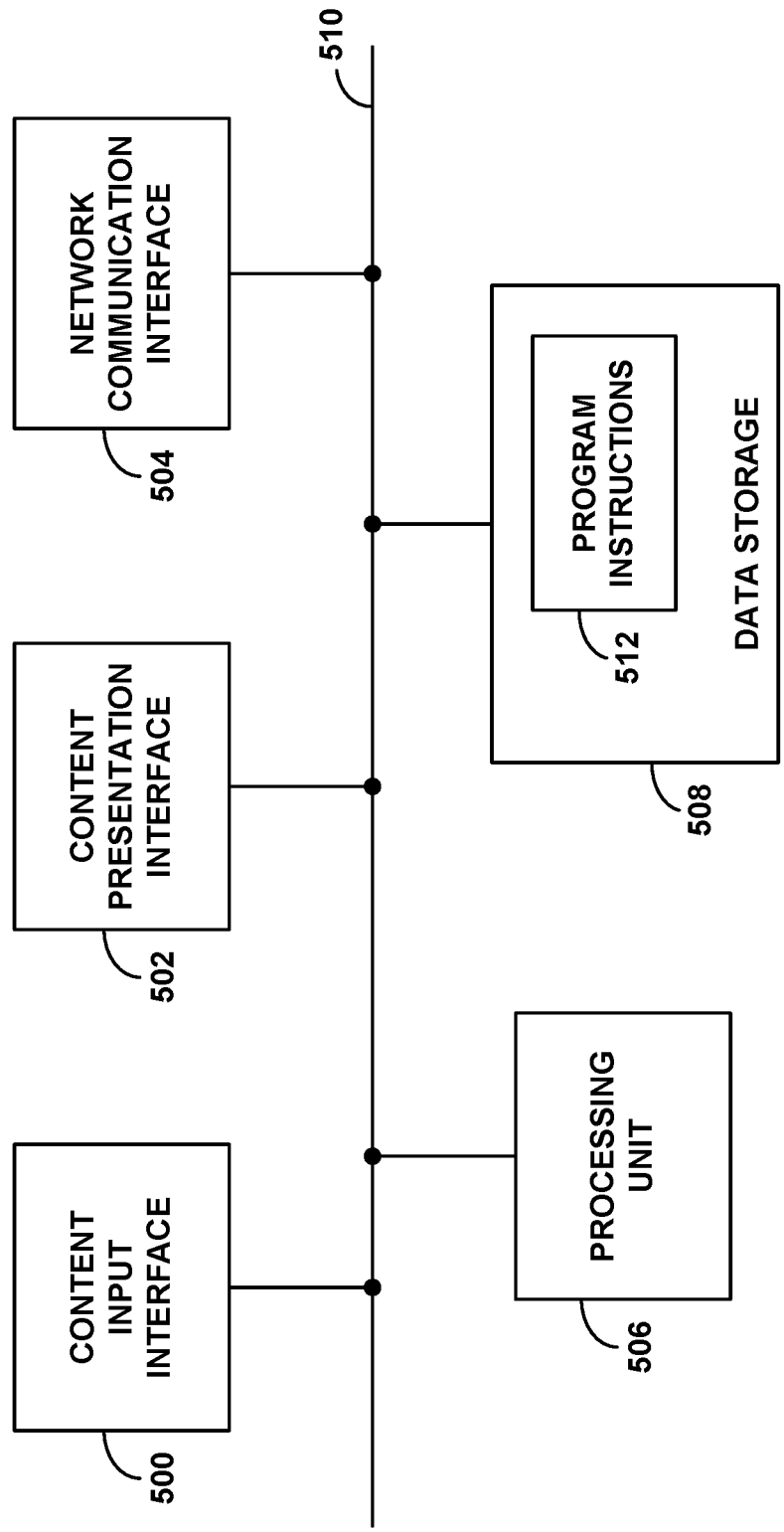

DYNAMIC WATERMARKING OF MEDIA BASED ON TRANSPORT-STREAM METADATA, TO FACILITATE ACTION BY DOWNSTREAM ENTITY

REFERENCE TO RELATED APPLICATIONS

This application claims priority to U.S. Provisional Patent Application No. 62/809,360, filed Feb. 22, 2019, and U.S. Provisional Patent Application No. 62/882,202, filed Aug. 2, 2019, the entirety of each of which is hereby incorporated by reference.

BACKGROUND

In a typical media distribution system, a producer or other provider of audio and/or video media content transmits a digital media stream representing the media content to one or more media distribution points, and each media distribution point in turn transmits the media stream to various end-user media clients for presentation. By way of example, a national television (TV) broadcaster in the United States may provide a digital television broadcast stream representing video program content to various multi-channel video program distributors (MVPD), such as cable or satellite TV head-ends, that serve respective market areas throughout the country, and each MVPD may in turn transmit the broadcast stream to various end-user TV reception devices in the MVPD's market area.

SUMMARY

In such a media distribution system, when a media stream is being transmitted directly or indirectly from one entity to another, it may be useful to convey metadata together with the media stream, for receipt and use of the metadata by the downstream entity.

Without limitation, for instance, when a national TV broadcaster delivers a broadcast stream to an MVPD for transmission by the MVPD to various end-user TV reception devices, it may be useful for the national broadcaster to convey with the broadcast stream certain metadata that could facilitate action by the MVPD. And as another example, when a national TV broadcaster and/or MVPD delivers a media stream directly or indirectly to a customer-premises receiver such as a set top box or the like serving an end-user TV, it may be useful for the broadcaster or MVPD to include with the media stream certain metadata that could facilitate action by the customer-premises receiver.

Conveying metadata together with a media stream being delivered from one entity to another could facilitate various types of actions by the downstream entity.

Without limitation, for instance, metadata that is related to an upcoming content-modification opportunity in the media stream could facilitate dynamic revision of the media stream by the downstream entity.

By way of example, it may be useful to dynamically replace an ad or other segment of the media stream with a replacement ad or other replacement content, so that when the media stream is played out to a user, the user would receive the replacement content in place of the originally included content. Such a revision could help tailor the media content to a particular market, consumer, or the like. Further, it may be desirable to perform such content revision at a specific time point within the media stream. For instance, if an existing ad is going to be replaced with a replacement ad, it may be desirable to position the replacement ad at a specific time in the media stream when the existing ad would have started.

To facilitate this, an entity that delivers the media stream could include together with the media stream certain information related to the upcoming content-modification opportunity, such as information specifying timing of the upcoming content-modification opportunity and/or information characterizing the type of content modification to perform, among other possibilities. When a downstream entity receives the media stream together with such metadata, the downstream entity could thus use the metadata as a basis to carry out, or cause to be carried out, the dynamic content revision.

As another example, metadata that identifies content of the media stream, such as a channel, program, or ad within the media stream, might facilitate media-consumption (e.g., viewership) reporting by the downstream entity. As a downstream entity such as a customer-premises receiver or TV receives the media stream to be processed and/or output for presentation to a user, the downstream entity could receive that metadata together with the media stream and, based on the media-identification specified by the metadata, could report to a data management server (e.g., a viewership server) the media-identification, as metering data that could facilitate targeted advertising decisions or the like.

Other examples could be possible as well.

One way to convey metadata together with a media stream is to include the metadata in-band within a transport stream that carries the media stream. Namely, the transport stream could separately carry (i) the media stream and (ii) the metadata.

For example, if the media stream is conveyed as payload within a sequence of transport packets (e.g., Internet Protocol (IP) packets or the like), the metadata could be conveyed within a header of each of one or more of the transport packets. Upon receipt of each such transport packet, a downstream entity could then not only receive payload representing a portion of the media stream but could also receive the metadata from the packet header. Alternatively, one or more special packets in the transport stream could carry the metadata within a header or payload portion. As the downstream entity receives the sequence of transport packets providing the media stream, the downstream entity could then receive the metadata from each special packet. In either case, the downstream entity could then use the received metadata as a basis to carry out a useful action, such as an action with respect to the media stream.

Example transport stream protocols that could be used to carry metadata include those defined by standards organizations such as the Society of Cable and Telecommunications Engineers (SCTE) and the Advanced Television Systems Committee (ATSC).

For instance, the SCTE has created standards that define a method for seamlessly splicing different segments of digital content into a packet-based transport stream such as a broadcast program stream. These standards provide for including within a transport stream special SCTE triggers that designate time points in the media stream where splicing is to occur, and for having an entity in the media-distribution path detect the presence of such a SCTE trigger and responsively carry out splicing at the indicated time point.

More particularly, the SCTE's Digital Program Insertion (DPI) standard provides for including within a packet-based transport stream special "splice_information" packets that specify time points where splicing is to occur in the stream.

Further, the standard provides that such a packet could designate an "out" time point where an entity is to splice away from the transport stream to other content, or an "in" time point where the entity is to splice back to the transport stream from other content (or alternatively a break duration defining how long the content replacement should last). Splice_information packets could carry this and other information in XML (fully parsed, or as a binary representation).

Thus, to enable time accurate replacement of a segment of a media stream carried by a packet-based transport stream, a provider of the transport stream could insert a SCTE splice_information packet that designates an out time point at the start of the media segment and could further insert a splice_information packet that designates an in time point at the end of the media segment. And an entity downstream in the media-distribution path could then detect the presence of those splice_information packets and could responsively splice in replacement content starting at the out-point and ending at the in-point.

In a representative implementation of this process, a national broadcaster could provide a packet-based transport stream that carries media stream including core program content and additionally including a commercial break defining a national ad. Further, per agreements with MVPDs, the national broadcaster could permit each MVPD to replace the included national ad with a local ad specific to the MVPD's market area. To facilitate this, the national broadcaster could insert into the transport stream one or more splice_information packets that designate when the local ad replacement is to start and end.

Thus, upon receipt of the national transport-stream feed, an MVPD could detect and read the splice_information packet(s) and could thereby determine the specific time in the media stream when the MVPD is to insert a replacement local ad. At the determined time, the MVPD could then splice a replacement local ad into the media stream, so as to produce a modified media stream. And the MVPD could transmit the modified media stream to one or more end-user TV reception devices for playout.

The ATSC has also developed one or more standards that enable conveying of metadata in-band within a transport stream that carries a media stream from one entity to another. A recent example of such a standard is ATSC 3.0.

Although conveying metadata in-band within a transport stream that also carries a media stream could work well in practice, that process may have some downsides.

One technical issue with the process is that, as a media stream is en route to a downstream entity, the metadata that is carried in the transport stream may be discarded or otherwise not conveyed together with the media stream to the downstream entity. This could happen in various ways.

By way of example, as a media stream is being communicated along a media-distribution path (e.g., from one entity to another), an entity within the media-distribution path might receive a transport stream that carries both the media stream and the metadata, and that entity might extract the media stream from the transport stream and forward the media stream to a downstream entity (e.g., a next or later entity in the media-distribution path) without also forwarding the metadata to the downstream entity.

For instance, a set top box or other customer-premises receiver might receive from an MVPD or other entity a transport stream that carries a media stream representing a channel of content and that also carries metadata. As the receiver receives that transport stream, the receiver may extract the media stream from the transport stream (e.g., de-packetize the media stream) and output the extracted media stream through HDMI or another interface to a TV for presentation. But in this process, the receiver may not forward to the TV the metadata that was also included in the transport stream. Therefore, the TV may not receive the metadata that was included in the transport stream and so may be unable to carry out useful action based on that metadata.

This example problem could occur with respect to dynamic content modification. Although conveying splice information in-band within a transport stream that carries a national broadcast to an MVPD might enable the MVPD to engage in time-accurate content revision of the media stream before distributing the media stream to various customer-premises devices, it might also be desirable to allow an end-user TV to engage in dynamic content modification. Allowing the end-user TV to engage in dynamic content modification such as dynamic ad insertion might allow content modification that is tailored specifically to the end-user's interests, demographics, or the like. Yet if the user's set top box de-packetizes the media stream and delivers merely the de-packetized media stream to the TV for playout, the TV may not receive the metadata that was carried in the transport stream and may therefore be unable to use that metadata as a basis to carry out the dynamic content modification.

As another example, an entity within the media-distribution path might receive the transport stream that carries the media stream and the metadata and might strip the metadata from the transport stream before forwarding the transport stream along the media-distribution path, so that a downstream entity receiving the media stream would likewise not receive the metadata that was carried by the transport stream.

For instance, industry practice in accordance with the SCTE standard suggests that a media distributor should strip any splice_information packets from a transport stream before delivering the transport stream to an end-user client, in order to prevent unauthorized "commercial killers" or the like. In particular, the industry concern is that an unauthorized party could detect the presence of splice_information packets and could undesirably remove (e.g., skip past) or replace included commercials in the media stream. Although splice_information packets could be secured through scrambling and/or encryption, the packets may still be sent separately within the transport stream, and there is a risk that they could be detected and used without authorization. Consequently, it may not be feasible or practical to maintain splice_information packets in a transport stream en route to an end-user media client, and so, once more, the end-user media client may be unable to use the splice-information metadata as a basis to carry out dynamic content modification.

Considering this technical issue, at issue is then how to convey to a downstream entity the metadata that was included in-band in a transport stream carrying a media stream en route to the downstream entity.

Disclosed is a mechanism to help address this issue.

In accordance with the disclosure, an intermediary in a media-distribution path could receive a transport stream that carries both a media stream and metadata, and the intermediary could read the metadata from the transport stream and then encode into the media stream a watermark (e.g., one or more watermarks) that expressly or by-reference conveys the metadata. When the downstream entity receives the media stream, the downstream entity could then conveniently decode the watermark from the media stream in order to obtain the metadata, and the downstream entity could use the metadata as a basis to carry out useful action.

These as well as other aspects, advantages, and alternatives will become apparent to those of ordinary skill in the art by reading the following detailed description, with reference where appropriate to the accompanying drawings. Further, it should be understood that the descriptions provided in this summary and below are intended to illustrate the invention by way of example only and not by way of limitation.

BRIEF DESCRIPTION OF THE DRAWINGS

FIG. 5 is a simplified block diagram of an example content presentation device that could operate in accordance with the disclosure.

DETAILED DESCRIPTION

Figure 1:
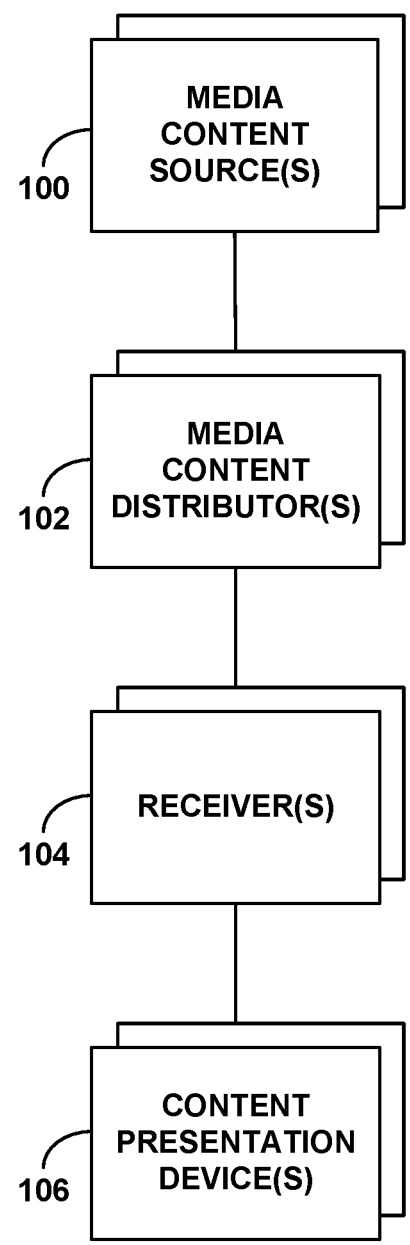
FIG. 1 is a simplified block diagram of an example system in which various disclosed principles can be applied.

Referring to the drawings, as noted above, FIG. 1 is a simplified block diagram of an example system in which various disclosed principles can be applied. It will be understood, however, that this and other arrangements and processes described herein can take various other forms. For instance, elements and operations can be re-ordered, distributed, replicated, combined, omitted, added, or otherwise modified. Further, it will be understood that functions described herein as being carried out by one or more entities could be implemented by and/or on behalf of those entities, through hardware, firmware, and/or software, such as by one or more processing units executing program instructions or the like.

As shown in FIG. 1, the example system includes one or more media content sources 100 (e.g., broadcasters, web servers, etc.), one or more media content distributors 102 (e.g., MVPDs, such as cable providers, satellite providers, over-the-air broadcast providers, web aggregators, etc.), one or more media content receivers 104 (e.g., cable receivers, satellite receivers, over-the-air broadcast receivers, computers or other streaming media receivers, etc.), and one or more clients or content presentation devices 106 (e.g., TVs or other display devices, loudspeakers or other audio output devices, etc.)

In an example implementation, the media content sources 100 could be national broadcasters, such as ABC, NBC, CBS, FOX, HBO, and CNN, the media content distributors 102 could be local affiliates and/or other local content distributors in designated market areas (DMAs), and the receivers 104 and content presentation devices 18 could then be situated at customer premises, such as homes or business establishments. With this or other arrangements, the content sources 100 could deliver media content to the content distributors 102 for distribution to receivers 104 at customer premises, and the content distributors could distribute the media content to the receivers 104 on discrete channels (e.g., particular frequencies or other defined channels). Each receiver could then respond to user input or one or more other triggers by tuning to a selected channel and outputting to a content presentation device 106 the media content that is arriving on the selected channel. And the content presentation device 106 could receive and render the media content (e.g., display or otherwise present the content).

With this example arrangement, the media-distribution path at issue could extend from a representative media content source 100 to a downstream entity such as a representative receiver 104 or content presentation device 106. And a media content distributor 102 such as an MVPD could be the intermediary that receives a transport stream carrying a media stream and metadata and that reads the metadata from the transport stream and encodes the metadata in a watermark in the media stream for receipt, decoding, and use by the downstream entity. Other example media-distribution paths, downstream entities, and intermediaries could be possible as well.

Figure 2:
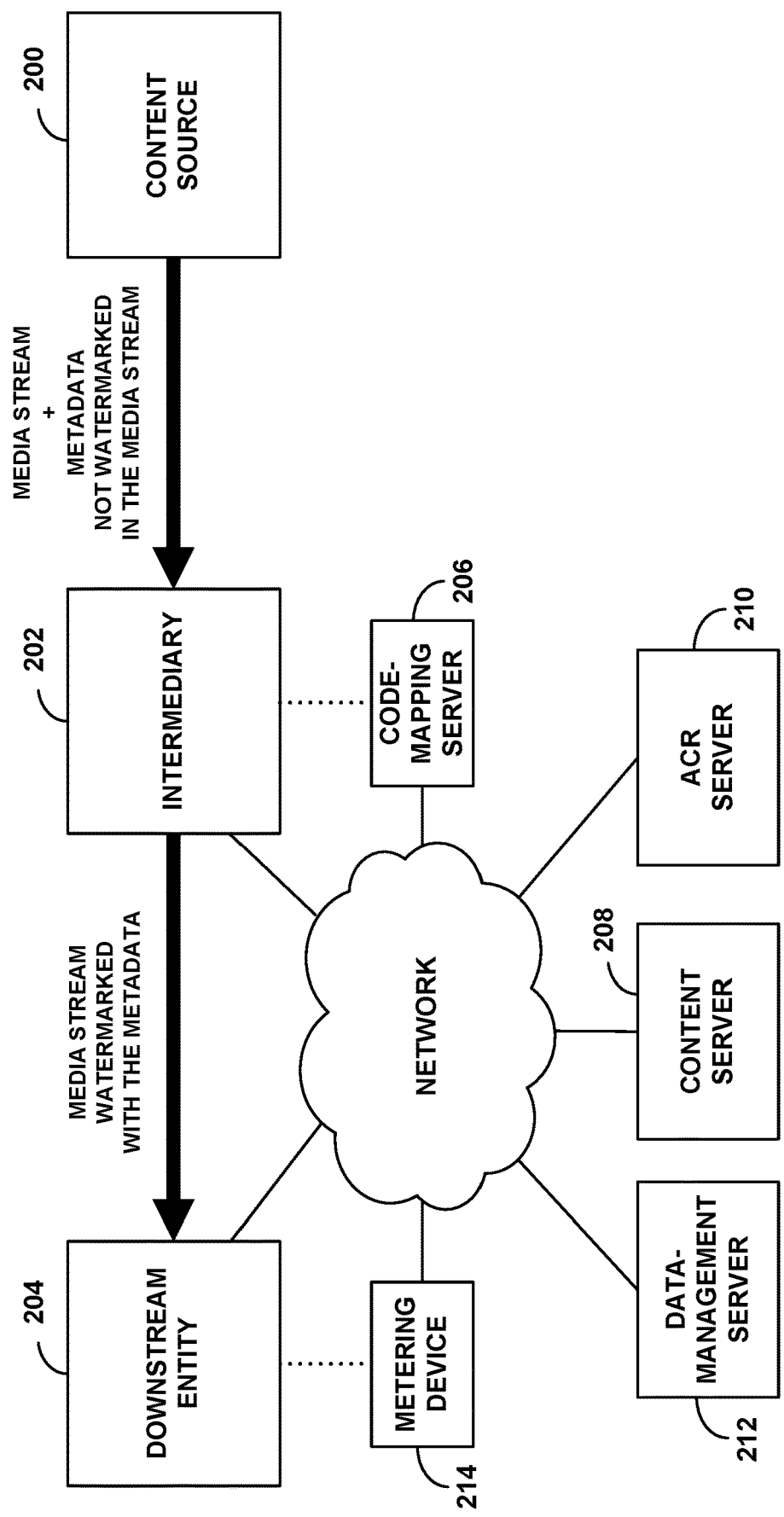
FIG. 2 is another simplified block diagram of an example system in which various disclosed principles can be applied.

FIG. 2 further illustrates an example system in which the presently disclosed features could be implemented.

FIG. 2 shows at its top an example media-distribution path extending from a content source 200 to a downstream entity 204 via an intermediary 202. Without limitation, for instance, the content source 200 could be a national broadcaster such as one of those noted above, the intermediary 202 could be an MVPD such as a local affiliate of the national broadcaster, and the downstream entity 204 could be a content presentation device such as a TV or the like, or a receiver such as a set top box or the like.

With this arrangement, an example media stream flows over the media-distribution path from the content source 200 to the intermediary 202 and then from the intermediary 202 to the downstream entity 204. Without limitation, this media stream could comprise and thus define a sequence of digital frames of media content, such as video content and/or audio content, perhaps representing a channel of content. The content source 200 could convey this media stream to the intermediary 202 in a packet-based transport stream, by conveying segments of the media stream in payload of transport-stream packets to the intermediary 202. And the intermediary 202 could then forward the media stream, possibly also in a packet-based transport stream or possibly stripped and/or transcoded, ultimately (for present purposes) to the downstream entity.

As shown in FIG. 2, the content source 200 conveys to the intermediary 202 the media stream together with metadata that is not watermarked into the media stream. As noted above, for instance, if the content source 200 conveys the media stream to the intermediary 202 in a packet-based transport stream, the content source could convey the media stream together with the non-watermarked metadata by conveying the metadata in a header respectively of each of one or more packets of the transport stream or perhaps as payload in one or more special packets of the transport stream, among other possibilities.

Further, as shown, the intermediary 202 then conveys to the downstream entity 204 the media stream watermarked with the metadata. As noted above, for instance, the intermediary 202 could read the metadata from the transport stream that the intermediary 202 receives from the content source 200, and the intermediary 202 could then steganographically encode a representation of the metadata into one or more watermarks in the media stream itself. The intermediary 202 could then output the media stream so watermarked with the metadata, and that watermarked media stream could then flow directly or indirectly to the downstream entity 204. The downstream entity 204 could then detect and decode the watermark(s) from the media stream so as to obtain the metadata and could use the metadata as a basis to carry out or more useful actions.

As is known in the art, watermarking involves permanently embedding or otherwise encoding information into media content in a manner that enables the information to be decoded and extracted from the media content by a receiver of the media content. Watermarking information into media content is in contrast to carrying the information together with the media content such as in a transport stream header or other packet where the information is not encoded in the media content itself. Watermarking permanently changes the media content and may be impossible to remove.

Watermarking information into media content could involve encoding into the media content a data representation of the information, perhaps directly encoding the information itself, or encoding a code that can be mapped to the information. In an example implementation, a watermark could be on the order of 24 bits, and the watermarking could be done in an audio component of the media content and/or in a video component of the media content.

Existing audio watermarking techniques include, without limitation, inserting audio energy into the audio signal or otherwise adjusting one or more characteristics of the audio signal in a manner that can be detected by a suitably configured watermark-detection algorithm but that is masked from hearing (e.g., the audio characteristic and/or manner of encoding being sufficient to hide the watermark from human detection)—known as stenographic or psychoacoustic encoding.

Examples of audio watermarks and corresponding watermark detection techniques are described in U.S. Pat. No. 8,359,205 (entitled "Methods and Apparatus to Perform Audio Watermarking and Watermark Detection and Extraction," which issued on Jan. 22, 2013), U.S. Pat. No. 8,369,972 (entitled "Methods and Apparatus to Perform Audio Watermarking Detection and Extraction," which issued on Feb. 5, 2013), U.S. Patent Application Pub. No. 2010/0223062 (entitled "Methods and Apparatus to Perform Audio Watermarking and Watermark Detection and Extraction," which was published on Sep. 2, 2010), U.S. Pat. No. 6,871,180 (entitled "Decoding of Information in Audio Signals," which issued on Mar. 22, 2005), U.S. Pat. No. 5,764,763 (entitled "Apparatus and Methods for Including Codes in Audio Signals and Decoding," which issued on Jun. 9, 1998), U.S. Pat. No. 5,574,962 (entitled "Method and Apparatus for Automatically Identifying a Program Including a Sound Signal," which issued on Nov. 12, 1996), U.S. Pat. No. 5,581,800 (entitled "Method and Apparatus for Automatically Identifying a Program Including a Sound Signal," which issued on Dec. 3, 1996), U.S. Pat. No. 5,787,334 (entitled "Method and Apparatus for Automatically Identifying a Program Including a Sound Signal," which issued on Jul. 28, 1998), and U.S. Pat. No. 5,450,490 (entitled "Apparatus and Methods for Including Codes in Audio Signals and Decoding," which issued on Sep. 12, 1995, all of which are hereby incorporated by reference in their entireties.

Existing video watermarking techniques, on the other hand, involve embedding a code or other data representation in a video component of the media content in a manner that can be detected by a suitably configured watermark-detection algorithm but that is masked from human visual detection.

Examples of video watermarking techniques include various spatial-domain techniques such as flipping pixels, embedding the watermark into least significant bits, and adding a pseudo-random noise pattern to the video, and various frequency-domain techniques, such as SVD domain watermarking, Discrete Fourier Transform watermarking, Discrete Cosine Transform watermarking, Discrete Wavelet Transform watermarking, and principal component analysis watermarking. Other examples are possible as well.

As noted above, the presently disclosed mechanism could facilitate conveying to the downstream entity various information related to dynamic content revision, such as information related to the timing and/or type of a dynamic content revision that the downstream entity should carry out with respect to the media stream being conveyed.

By way of example, the disclosed mechanism could facilitate conveying splice information to enable the downstream entity to carry out dynamic ad insertion in the media stream.

For instance, an MVPD as the intermediary 202 could receive from a national TV broadcaster as the content source 200 a transport stream that carries a media stream representing a TV channel including TV program content (e.g., various TV programs) and one or more commercial breaks (e.g., an ad pod defining a sequence of commercials), and the transport stream could include one or more SCTE splice_information packet carrying splice information such as a designation of a splice point as the start of a commercial break or the start of a particular commercial within the commercial break.

As the MVPD receives the transport stream from the content provider, the MVPD could monitor for and detect the presence of a splice_information packet, perhaps based on header information that indicates it is a splice_information packet and/or based on one or more other indicia. And the MVPD could then read the XML contents of the splice_information packet to determine and thus extract or otherwise obtain from the packet the splice information, such as the information regarding the designated upcoming splice point and perhaps other such metadata.

In response to detecting the splice_information packet that carries the splice information such as the designation of the splice point and upon obtaining the splice information from the packet, the MVPD could then encode into the media stream a watermark representing the obtained splice information, so that the downstream entity 204 could obtain the splice information from the watermark and could use the splice information as a basis to carry out dynamic ad insertion. Further, in line with industry practice, if MVPD would forward the transport stream to the downstream entity 204, the MVPD could also responsively strip the splice_information packet from the transport stream before forwarding the transport stream, so that the downstream entity 204 will not receive the splice_information packet.

In this example process, the MVPD or other intermediary 202 that receives the transport stream carrying a media stream en route to the downstream entity 204 and including an in-band splice_information packet that designates a splice point and/or other splice-related information could read splice-related information from the packet and could thus determine one or more characteristics of an associated splice point. Considering an SCTE splice_information packet for example, the intermediary 202 could read the packet to determine the specific time point where splicing is to occur in the media stream that is also carried by the transport stream, with the time point being immediate (meaning that the splice should occur at the nearest possible time) or being indicated as a time-offset value such as a quantity of clock ticks of a 90 kHz clock starting at the time of the splice_information packet. Further, the intermediary 202 could read the packet to determine the type of splice point, such as whether the splice point is a splice-out point or a splice-in point as discussed above.

Having read this in-band splice-information metadata from the packet, the intermediary 202 could then encode into the media content of the media stream a watermark that will be interpretable by the downstream entity 204 to enable (e.g., to cause) the downstream entity to perform a content revision in accordance with the splice information.

For instance, the intermediary 202 could expressly encode into the media content of the media stream a binary representation of the time when the downstream entity 204 should perform a content revision and perhaps further indicates the type of content revision, such as a splice-out or a splice-in, among other possibilities. Alternatively, the intermediary could encode into the media content of the stream a binary code that specifies this splice information by reference. For instance, the intermediary 202 might record at a network server (e.g., a code-mapping server) 206 a mapping between the binary code and the splice information, so that when the downstream entity 204 extracts the watermarked binary code from the media stream, the downstream entity 204 could then query the server 206 to determine the splice information based on the extracted binary code.

As to the time point of the content revision, if the in-band splice information in the transport stream specifies the time of the splice point by specifying a time offset from the time at which the splice information is positioned in the transport stream (e.g., in correlation with a time point in the media stream being carried by the transport stream), then the intermediary 202 could encode that time offset expressly or by reference in the watermark—assuming that the intermediary 202 would position the watermark at the same time point in the media stream as was specified by the splice information in the transport stream.

For instance, the intermediary 202 could encode in the watermark the actual offset value, or the intermediary 202 could encode in the watermark a value that the downstream entity 204 could map to the actual offset value by querying a server 206 as noted above or by using a mapping table or other mapping data provisioned at the downstream entity 204 or provided in the media stream or transport stream (if applicable). With a binary watermark, for example, the intermediary 202 could encode the offset using a binary value, such as with a value of 00 corresponding with an offset of 2 seconds, a value of 01 corresponding with an offset of 3 seconds, and a value of 10 corresponding with an offset of 4 seconds, among other possibilities. Thus, upon decoding the watermark and reading this value, the downstream entity 204 could carry out a content revision at the time offset determined from the watermark.

Alternatively, based on the time point indicated by the in-band splice information that the intermediary 202 read from the transport packet, the intermediary could compute an absolute time in the media stream at which the content revision should occur, and the intermediary could then encode that computed absolute time in the watermark in the media stream.

Here, the absolute time could be a time point within in a timeline of the media stream. If the media stream defines a sequence of frames that are timestamped or otherwise numbered in a manner understandable to the downstream entity 204 that will read the watermark and take action, the time point could be the frame number.

Alternatively, if the media stream defines a timeline in another manner, the time point could be a time within that timeline. By way of example, if the intermediary 202 encodes the watermark at a specific time point within the media stream, the intermediary 202 could include in the watermark a timestamp of that specific time point, generating the timestamp according to a timeline within the media stream or according to the intermediary's clock. That way, when the downstream entity 204 decodes the watermark and reads the timestamp, the downstream entity 204 could establish a time mapping (i.e., synchronous lock), such as a time offset, between the current time according to the downstream entity's own clock and the time indicated by the watermark. Further, the intermediary 202 could include in the watermark, or in a separate watermark or other message that will be received by the downstream entity 204, an indication of the absolute time where the content revision should occur, with the indicated absolute time also being according to the intermediary's clock. And upon receipt of this absolute time value, the downstream entity 204 could then apply its established time mapping to translate the indicated absolute time to a time value according to the downstream entity's own clock, so that the downstream entity 204 could then carry out the indicated content revision at the correct time point based on the downstream entity's clock.

In either case, the intermediary 202 could encode in the watermark the actual value of the absolute time, or the intermediary 202 could encode in the watermark a value that the downstream entity 204 could map to the absolute time by querying a server 206 and/or by using mapping data provisioned at the downstream entity or provided in or with media stream. Thus, upon decoding the watermark and reading this value, the downstream entity 204 could carry out a content revision at the indicated absolute time.

As to the type of content revision, if the in-band metadata in the transport stream indicates expressly or by-reference the type of content revision to apply with respect to the media stream, then the intermediary 202 could encode in the watermark, expressly or by reference, the same type of content revision. For instance, if the in-band metadata indicates that the content revision is to be a splice-out (switching from the media stream to other content), then the intermediary 202 could encode in the watermark an indication that the content revision is to be a splice-out. Whereas, if the in-band metadata indicates that the content revision is to be a splice-in (switching back from other content to the media stream), then the intermediary 202 could encode in the watermark an indication that the content revision is to be a splice-in. With a binary watermark, for instance, the intermediary could specify this with a single bit, such as with a value of "1" indicating a splice-out event and a value of "0" indicating a splice-in event. Thus, upon decoding the watermark and reading this value, the downstream entity 2-4 could carry out the type of content revision indicated.

Note also that intermediary 202 could encode in the watermark additional or other information about the content revision that the downstream entity 204 is to perform, perhaps similarly using a code that the downstream entity 204 could map to a particular action or content-revision characteristic using a server query and/or mapping data provisioned at the downstream entity 204 or provided in the media stream.

By way of example, the intermediary 202 could encode in the watermark an indication of or related to what other content the downstream entity 204 is to splice into the media stream at the indicated time point.

For instance, the intermediary 202 could encode in the watermark a code that directs the downstream entity 204 to request replacement content from a content server 208, such as a replacement ad from an ad server. Further, the code could map to a specific content server 208, such as by mapping to a Uniform Resource Locator (URL) of a particular content server, and perhaps further to specific replacement content that the downstream entity 204 is to request from the content server 208. Upon decoding the watermark and reading this code, the downstream entity 204 could thus send to the content server 208 a request for replacement content and could receive replacement content in response and then splice that replacement content into the media stream at the indicated time point.

Alternatively, the intermediary 202 could encode in the watermark a code that directs the downstream entity 204 to select replacement content from local storage at the downstream entity, such as one of various pre-cached replacement ads for instance, and the code could further map to specific replacement content that the downstream entity 204 is to retrieve from the local storage. Thus, upon decoding the watermark and reading this code, the downstream entity 204 could retrieve replacement content from its local storage and could splice that replacement content into the media stream at the indicated time point.

Further, if the in-band metadata indicates a splice-out point and specifies a duration of the content revision that is to begin at the indicated time point, such as a duration of a commercial break where dynamic ad replacement is to occur, the intermediary 202 could encode in the watermark that duration. With a binary watermark, for instance, the intermediary 202 could use several bits to specify a duration in seconds. Or the intermediary 202 could encode the duration as a binary value that the downstream entity 204 could map to the duration using mapping data. For instance, a value of 00 could correspond with 15 seconds, a value of 01 could correspond with 30 seconds, a value of 10 could correspond 60 seconds, and the so forth. Thus, upon decoding the watermark and reading this value, the downstream entity 204 could carry out a content revision for the indicated duration.

Still further, the watermark that the intermediary 202 encodes into the media content could include a code that the downstream entity 204 would interpret as a trigger for engaging in content revision, and the intermediary 202 could use another form of messaging to the downstream entity 204 to provide the downstream entity 204 with a time point, duration, and/or other characteristics of the indicated content revision. For example, the intermediary 202 could encode in the watermark a value that the downstream entity 204 would interpret as meaning that a content revision should occur, and the intermediary 202 could encode in the watermark a reference code that would map to content-revision characteristic data. And the intermediary 202 could separately transmit to the downstream entity (e.g., through out-of-band IP messaging) a message that correlates that reference code to one or more content-revision characteristics. Thus, upon decoding the watermark and reading this reference code, the downstream entity 204 could map the reference code to the indicated content-revision characteristics and could carry out the content revision accordingly.

Yet further, as another implementation, the watermark that the intermediary 202 encodes into the media content could include a code that the downstream entity 204 would interpret as a trigger for engaging in content revision where next appropriate in the media stream, e.g., at a next appropriate content-revision opportunity.

For instance, for video content (e.g., a video-only stream, or a video component of a media stream that also includes an audio component), this code could direct the downstream entity 204 to engage in a content revision at the next instance where the media stream transitions to one or more black frames (perhaps indicative of a point where program content may transition to a commercial break or where one commercial may transition to another commercial). Upon decoding the watermark and reading this code, the downstream entity 204 could then responsively monitor the video stream to detect when the black frames occur and, upon detecting the black frames, could then responsively carry out the content revision.

One way for the downstream entity 204 to detect the presence of black frames is to engage in fingerprint analysis and automated content recognition (ACR). For instance, in response to detecting the watermark, the downstream entity 204 could begin a process of generating a digital fingerprint of each of various frames of the video stream and transmitting the generated digital fingerprints to an automatic content recognition (ACR) server 210 for analysis or by self-analyzing the fingerprints. Through the fingerprint analysis, individual frames of the video stream could be deemed black frames. Alternatively, the downstream entity 204 could detect presence of black frames in another manner. In any event, upon thereby detecting the presence of black frames, the downstream entity 204 could then responsively carry out the content revision.

Likewise, for audio content (e.g., an audio-only stream, or an audio component of a media stream that also includes a video component), this code could direct the downstream entity 204 to engage in a content revision at the next instance where the media stream transitions to a threshold long duration of silence (perhaps similarly indicative of a point where program content may transition to a commercial break, or where one commercial may transition to another commercial). Upon decoding the watermark and reading this code, the downstream entity 204 could then responsively monitor the audio stream to detect when the threshold long duration of silence occurs and, upon detecting the that duration of silence, could then responsively carry out the content revision.

In a non-limiting example implementation, as noted above, the downstream entity 204 could be a set to box that operates to receive the transport stream and to transmit the media content of the stream (e.g., via HDMI or another connection mechanism) to a TV or other such content presentation device, and perhaps to store the media content for later output. Such a set top box could be pre-provisioned with mapping data as discussed above and with replacement ad content or the ability to obtain replacement ad content from a network server or the like. Thus, when the set top box receives the transport stream and decodes the watermark inserted by the intermediary 202, the set top box could appropriately interpret the watermark and could respond by carrying out dynamic ad insertion.

Alternatively, the downstream entity 204 could be a TV or other content presentation device, which might receive the media content of the media stream by receiving the transport stream or by receiving the media content from a set top box or other entity, and may present the media content to a user. Such a content presentation device could likewise be pre-provisioned with mapping data as discussed above and with replacement ad content or the ability to obtain replacement ad content from a network server or the like. Thus, when the content presentation device receives the media content and decodes the watermark, the content presentation device could appropriately interpret the watermark and respond by carry out desired dynamic ad insertion.

Further, this process could be carried out respectively for each of various downstream entities, so that it would be technically feasible to provide more targeted dynamic ad insertion, without passing the SCTE splice_information packet along to each downstream entity. For instance, a downstream TV receiver at one household may receive from an MVPD a transport stream carrying the media stream with the watermark added by the MVPD, and the receiver may responsively splice into the media stream an ad that is selected based on demographics or preferences of that household, whereas a downstream TV receiver at another household may receive from the MVPD the same transport stream carrying the same media stream with the same added watermark and may responsively splice into the underlying media stream a different ad that is selected based on demographics or preferences of that other household.

As another non-limiting example, the presently disclosed mechanism could be used to facilitate media-consumption reporting.

Here, for instance, the metadata that flows to the intermediary 202 together with, but not watermarked into, the media stream could include information that identifies content of the media stream, such as an identification of the channel, program, or ad represented by the media stream. For instance, this could be an ad-ID that uniquely identifies the ad or a source-ID that uniquely identifies the channel. And if the information identifies a specific portion of the media stream such as a specific ad included in the media stream, the information could be provided in time alignment with that portion of the media stream, such as within a transport packet that carries at least a segment of that portion of the media stream.

In line with the discussion above, intermediary 202 could read this in-band metadata and could then steganographically encode into the media stream itself a watermark that specifies expressly or by reference the identification information, so as to enable the downstream entity 204 to use the identification information for media-consumption reporting. Further, if the identification information is provided in time alignment with a specific portion of the media stream, the intermediary 202 could embed the watermark in the media stream at or about that same portion, so as to correlate the watermarked identification information with that portion.

When the downstream entity 204 (e.g., a customer-premises receiver or TV) receives the media stream to be processed and/or output for presentation to a user, the downstream entity 204 could thus detect and decode this watermark and thereby obtain the identification information. And the downstream entity 204 could use the obtained identification information to carry out media-consumption reporting. For instance, in response to detecting and obtaining the watermarked identification information, the downstream entity could report to a data management server 212 the identification information, as metering data that could help facilitate tracking of media consumption for purposes of targeted advertising or the like.

Alternatively, a metering device 214 that is in media communication with an example downstream entity 204 could operate to detect the watermarked identification information in the media stream being and to report the identification information to the data management server 212. For instance, if the downstream entity 204 is a TV or other content presentation device, a metering device 214 nearby the content presentation device could monitor the media content being played out by the content presentation device and could detect in that media content the presence of the watermark encoding the identification information. And the metering device 214 could then responsively report the detected identification information to the data management server 212.

Figure 3:
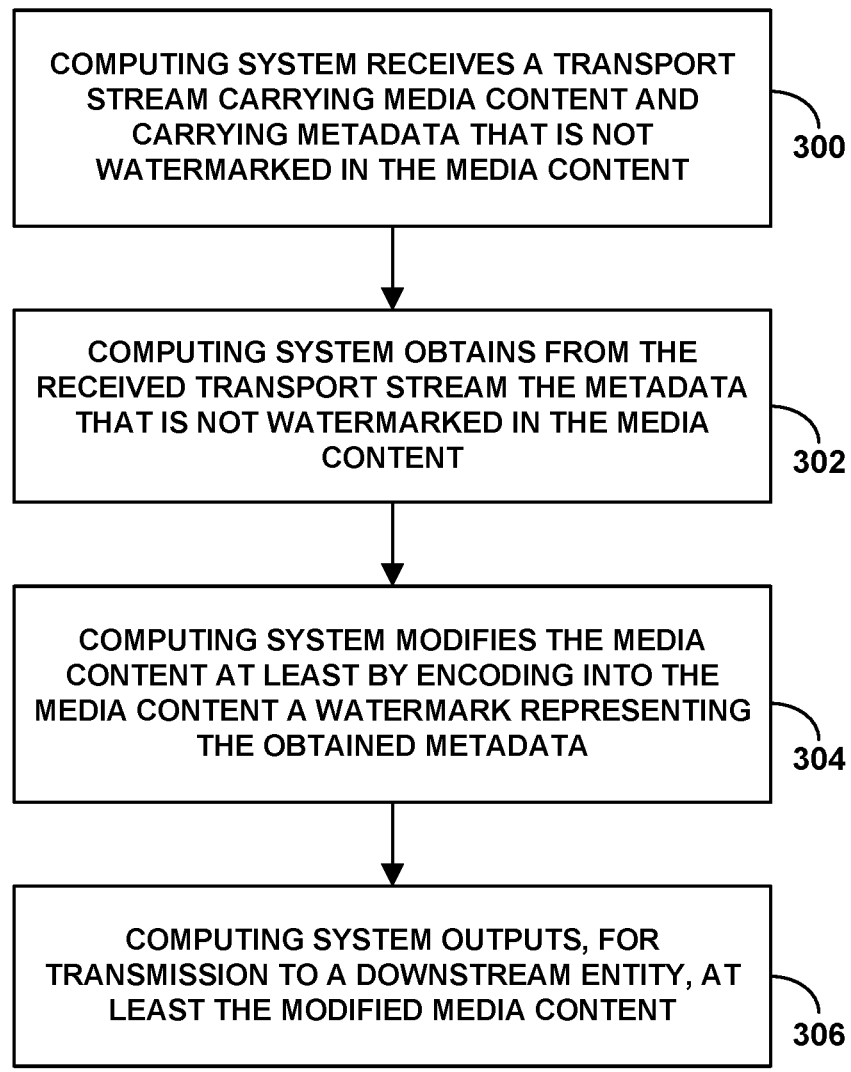
FIG. 3 is a flow chart depicting a method that could be carried out in accordance with the disclosure.

FIG. 3 is a flow chart depicting a method that can be carried out in accordance with the present disclosure.

As shown in FIG. 3, at block 300, the method includes receiving into a computing system a transport stream carrying media content and carrying metadata that is not watermarked in the media content. At block 302, the method then includes the computing system obtaining from the transport stream the metadata that is not watermarked in the media content. And at block 304, the method includes the computing system modifying the media content at least by encoding into the media content a watermark representing the obtained metadata. At block 306, the method then includes outputting from the computing system, for transmission to a downstream entity, at least the modified media content.

In line with the discussion above, the transport stream in this method could carry the media content in a sequence of packets and could carry the metadata in a header portion of at least one of the packets. Alternatively or additionally, the sequence of packets could include packets carrying the media content and could also include at least one packet carrying the metadata, e.g., in a payload portion of the packet.

Further, as discussed above, the metadata could include splice information for a splice point in the media content. For instance, the media content could be a sequence of content defining a media stream, and the metadata could include timing information indicating when in the media stream a dynamic content revision, such as dynamic ad insertion, should be performed.

Further, as discussed above, the metadata could include (i) a duration of a dynamic content revision that should be performed as to the media content, (ii) a timestamp useable by the downstream entity to establish synchronous lock, (iii) an indication of a type of content revision to apply with respect to the media content, (iv) information for obtaining replacement content to replace a portion of the media content, (v) a trigger for the downstream entity to engage in revision of the media content, and/or (vi) media-content identification information to facilitate media-consumption reporting, among other possibilities.

Figure 4:
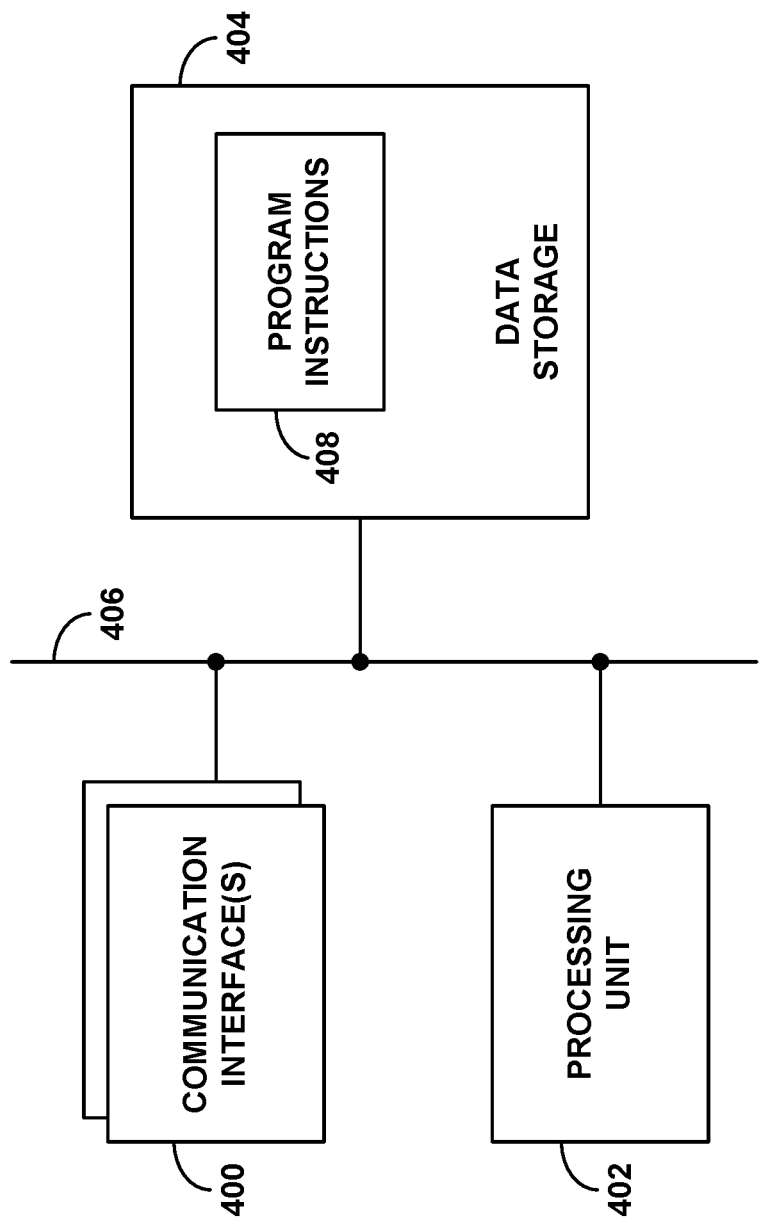
FIG. 4 is a simplified block diagram of an example computing system that could operate in accordance with the disclosure.

FIG. 4 is next a simplified block diagram of a computing system that could operate in accordance with the present disclosure. This computing system could represent the intermediary 202 discussed above for instance, among other possibilities.

As shown in FIG. 4, the computing system includes one or more communication interfaces 400, a processing unit 402, and non-transitory data storage 404, any or all of which could be integrated together or, as shown, communicatively linked together by a system bus, network, or other connection mechanism 406.

The one or more communication interfaces 400 could comprise one or more network connection mechanisms to facilitate communication as discussed above, such as to facilitate receiving a media stream together with metadata that is not watermarked in the media content and to output the media stream watermarked with the metadata. Each such network communication interface could comprise a wireless or wired Ethernet interface or other type of network interface, for engaging in IP communication and/or other type of network communication.

The processing unit 402 could comprise one or more general purpose processors (e.g., microprocessors) and/or one or more specialized processors (e.g., application specific integrated circuits). And the non-transitory data storage 404 could comprise one or more volatile and/or non-volatile storage components, such as optical, magnetic, or flash storage for instance.

As shown, the data storage 404 of the example computing system stores program instructions 408. These program instructions could be executable by the processing unit 402 to carry out (e.g., to cause the computing system to carry out) various operations described herein, such as (i) reading from the transport stream, metadata that is carried by the transport stream and that is not watermarked in the media stream, (ii) responsive to reading the metadata from the transport stream, modifying the media stream by at least encoding into the media stream a watermark interpretable by the downstream entity to convey the metadata, thereby generating the modified version of the media stream, and (iii) outputting for transmission along the media-distribution path to the downstream entity the modified version of the media stream.

Various features discussed above can be implemented in this context as well, and vice versa.

Finally, FIG. 5 is a simplified block diagram of an example content presentation device, operable in accordance with the present disclosure as a non-limiting example of downstream entity 204. This content presentation device could take various forms. For instance, it could be a television, computer monitor, or other device that operates to receive and render video content, and/or it could be a loudspeaker, a pair of headphones, or other device that operates to receive and render audio content. Numerous other examples are possible as well.

As shown in FIG. 5, the example content presentation device includes a content input interface 500, a content presentation interface 502, a network communication interface 504, a processing unit 506, and non-transitory data storage 508, any or all of which could be integrated together or, as shown, communicatively linked together by a system bus, network, or other connection mechanism 510.

Content input interface 500 could comprise a physical communication interface for receiving media content, such as a media stream, to be presented by the content presentation device. As such, the media input interface could include one or more wired and/or wireless interfaces for establishing communication with and receiving media content in analog or digital form from a receiver or other device or system. For example, the media input interface could include one or more interfaces compliant with protocols such as DVI, HDMI, VGA, USB, BLUETOOTH, WIFI, among numerous others, and/or a tuner and/or receiver for receiving content more directly from a content distributor or the like.

The content presentation interface 502 could then comprise one or more components to facilitate presentation of the received media content. By way of example, the content presentation interface 502 could comprise a user interface such as a display screen and/or a loudspeaker, as well as one or more drivers or other components for processing the received media content to facilitate presentation of the content on the user interface.

The network communication interface 504 could comprise a network connection mechanism to facilitate communication on a network, and/or for engaging in direct or networked communication with one or more other local or remote entities. As such, the network communication interface could comprise a wireless or wired Ethernet interface or other type of network interface, for engaging in IP communication and/or other type of network communication.

The processing unit 506 could then comprise one or more general purpose processors (e.g., microprocessors) and/or one or more specialized processors (e.g., application specific integrated circuits). And the non-transitory data storage 508 could comprise one or more volatile and/or non-volatile storage components, such as optical, magnetic, or flash storage. Further, the data storage 508 stores program instructions 512, which could be executable by processing unit 506 to carry out (e.g., to cause the content presentation device to carry out) various operations described herein.

Various features described above could be applied in this context as well, and vice versa.

Further, the present disclosure also contemplates at least one non-transitory computer readable medium encoded with or otherwise embodying program instructions executable by at least one processing unit to carry out various operations as described herein.

Exemplary embodiments have been described above. Those skilled in the art will understand, however, that changes and modifications may be made to these embodiments without departing from the true scope and spirit of the invention. For example, the principles discussed above could apply as well to facilitate conveying other types of metadata. Other examples are also possible.

We claim:

1. A method comprising:

receiving, into a computing system, a packet-based transport stream carrying a media stream that defines media content and carrying metadata that is not watermarked in the media stream, wherein the transport stream includes a splice-information packet that carries the metadata, and wherein the metadata specifies a splice time point in the media stream as a time-offset value measured from a time of the splice-information packet;

obtaining, by the computing system, from the transport stream, the metadata that is not watermarked in the media stream, wherein obtaining the metadata from the transport stream comprises detecting the splice-information packet and reading the metadata, including the specified splice time point, from the detected splice-information packet;

computing, by the computing system, an absolute time point in the media stream, based on the splice time point that the computing system read from the detected splice-information packet;

modifying, by the computing system, the media stream by at least encoding into the media stream a watermark representing the computed absolute time point; and outputting from the computing system, for transmission to a downstream entity, at least the modified media stream, wherein the absolute time point defines an absolute time value according to a clock of the computing system, and wherein modifying the media stream additionally includes encoding by the computing system into the media stream, at a specific time point in the media stream, a timestamp of the specific time point also according to the clock of the computing system, to enable the downstream entity to (i) establish a time mapping between time according to a clock of the downstream entity and time according to the clock of the computing system and (ii) apply the established time mapping to translate the absolute time value to a time value according to the clock of the downstream entity.

2. The method of claim 1, wherein detecting the splice-information packet is based on header information indicating that the splice-information packet is the splice-information packet.

3. The method of claim 1, wherein the splice time point and absolute time point define when in the media stream a dynamic content revision should be performed.

4. The method of claim 3, wherein the dynamic content revision comprises dynamic ad insertion.

5. The method of claim 1, wherein the media stream defines a sequence of frames, and wherein the absolute time point is a timestamp of one of the frames.

6. The method of claim 1, wherein the metadata further indicates a duration of a dynamic content revision that should be performed as to the media stream, and wherein the watermark represents the indicated duration.

7. The method of claim 1, wherein the metadata further indicates of a type of content revision to apply with respect to the media stream, and wherein the watermark represents the indicated type of content revision.

8. The method of claim 7, wherein the type of content revision is selected from the group consisting of a splice-in and a splice-out.

9. The method of claim 1, wherein the metadata further comprises information for obtaining replacement content to replace a portion of the media stream, and wherein the watermark represents the information.

10. The method of claim 1, wherein the metadata further comprises media-content identification information to facilitate media-consumption reporting, and wherein the watermark represents the media-content identification information.

11. The method of claim 1, where the watermark defines a trigger for the downstream entity to engage in revision of the media stream.

12. The method of claim 1, wherein encoding the timestamp of the specific point is in the same watermark that represents the computed absolute time point.

13. A computing system comprising:
one or more communication interfaces through which to receive a packet-based transport stream carrying a media stream and through which to output along a media-distribution path at least a modified version of the media stream for transmission to a downstream entity;
a processing unit;
non-transitory data storage; and
program instructions stored in the non-transitory data storage and executable by the processing unit to carry out operations including:
reading from the transport stream, metadata that is carried by the transport stream and that is not watermarked in the media stream, wherein the transport stream includes a splice-information packet that carries the metadata, wherein the metadata specifies a splice time point in the media stream as a time-offset value measured from a time of the splice-information packet, and wherein reading the metadata from the transport stream comprises detecting the splice-information packet and reading the metadata, including specified splice time point, from the detected splice-information packet,
computing an absolute time point in the media stream based on the splice time point read from the detected splice-information packet,
modifying the media stream by at least encoding into the media stream a watermark representing the computed absolute time point, thereby generating the modified version of the media stream, and
outputting for transmission along the media-distribution path to the downstream entity the modified version of the media stream,
wherein the absolute time point defines an absolute time value according to a clock of the computing system, and wherein modifying the media stream additionally includes encoding into the media stream, at a specific time point in the media stream, a timestamp of the specific time point also according to the clock of the computing system, to enable the downstream entity to (i) establish a time mapping between time according to a clock of the downstream entity and time according to the clock of the computing system and (ii) apply the established time mapping to translate the absolute time value to a time value according to the clock of the downstream entity.

14. The computing system of claim 13, wherein the media-distribution path extends at least from a content source to the downstream entity, and wherein the computing system is an intermediary in the media-distribution path.

15. The computing system of claim 13, wherein the splice time point and absolute time point define when in the media stream a dynamic content revision should be performed.

16. The computing system of claim 15, wherein the dynamic content revision comprises dynamic ad insertion.

17. The computing system of claim 13, wherein the metadata further indicates a duration of a dynamic content revision that should be performed as to the media stream, and wherein the watermark represents the indicated duration.

18. The computing system of claim 13, wherein the metadata further indicates of a type of content revision to apply with respect to the media stream, and wherein the watermark represents the indicated type of content revision.

19. The computing system of claim 18, wherein the type of content revision is selected from the group consisting of a splice-in and a splice-out.

20. The computing system of claim 13, wherein the metadata further comprises information for obtaining replacement content to replace a portion of the media stream, and wherein the watermark represents the information.

21. The computing system of claim 13, wherein encoding the timestamp of the specific point is in the same watermark that represents the computed absolute time point.

22. A non-transitory computer-readable medium embodying instructions executable by a computing system to carry out operations including:
receiving a packet-based transport stream carrying a media stream that defines media content and carrying metadata that is not watermarked in the media stream, wherein the transport stream includes a splice-information packet that carries the metadata, and wherein the metadata specifies a splice time point in the media stream as a time-offset value measured from a time of the splice-information packet;
obtaining, from the transport stream, the metadata that is not watermarked in the media stream, wherein obtaining the metadata from the transport stream comprises detecting the splice-information packet and reading the metadata, including the specified splice time point, from the detected splice-information packet;

computing an absolute time point in the media stream, based on the splice time point read from the detected splice-information packet;

modifying the media stream by at least encoding into the media stream a watermark representing the computed absolute time point; and outputting, for transmission to a downstream entity, at least the modified media stream, wherein the absolute time point defines an absolute time value according to a clock of the computing system, and wherein modifying the media stream additionally includes encoding into the media stream, at a specific time point in the media stream, a timestamp of the specific time point also according to the clock of the computing system, to enable the downstream entity to (i) establish a time mapping between time according to a clock of the downstream entity and time according to the clock of the computing system and (ii) apply the established time mapping to translate the absolute time value to a time value according to the clock of the downstream entity.

23. The non-transitory computer-readable medium of claim 22, wherein encoding the timestamp of the specific point is in the same watermark that represents the computed absolute time point.

* * * * *